United States Patent [19]

Dunse

[11] Patent Number: 5,427,529
[45] Date of Patent: Jun. 27, 1995

[54] BALL AND STICK LETTER GAME AND METHOD OF PLAY

[76] Inventor: Walter D. Dunse, 410 S. Washington, Jerseyville, Ill. 62052

[21] Appl. No.: 231,926

[22] Filed: Apr. 25, 1994

[51] Int. Cl.⁶ .................................................. G09B 1/02
[52] U.S. Cl. ........................... 434/167; 434/156; 273/58 K; 273/DIG. 30; 273/445; 273/412; 273/118 R
[58] Field of Search ............ 434/167, 159, 156; 273/58 K, DIG. 30, 58 A, 58 B, 445, 447, 346, 347, 412, 118 R, 138 R

[56] References Cited

U.S. PATENT DOCUMENTS

| | | | |
|---|---|---|---|
| 2,504,650 | 4/1950 | Chessrown | 273/58 B |
| 4,344,627 | 8/1982 | Jones et al. | 273/273 |
| 4,360,206 | 11/1982 | Bian | 273/412 X |
| 4,690,409 | 9/1987 | Scalia | 273/299 |
| 4,789,161 | 12/1988 | Waskelo | 273/DIG. 30 X |
| 4,961,580 | 10/1990 | Yoe et al. | 273/447 |
| 5,056,786 | 10/1991 | Bellettini et al. | 273/DIG. 30 X |
| 5,161,976 | 11/1992 | Crowe | 434/159 |

OTHER PUBLICATIONS

"Sticky Finger", Product No. 151, Mascon Toy Co. (Catalog), 1966.

Primary Examiner—Gene Mancene
Assistant Examiner—Jeffrey A. Smith
Attorney, Agent, or Firm—Don W. Weber

[57] ABSTRACT

An alphabet learning and word forming game is presented which utilizes a round ball having letters on its surface and four pick-up sticks. The surface of the alphabet ball is made of a material that is readily attached to one end of the pick-up stick. This attaching mechanism may be a vinyl ball and a pick-up stick having suction cups on one end or it may be a ball covered with a clear adhesive pile surface and a pick-up stick with a VELCRO hook surface on one end. The ball is rolled between players and the pick-up stick is attached to the ball such that one letter is underneath the pick-up stick each time it is rolled. The players accumulate points for forming words during a set time period from the letters which they have obtained through catching the ball with the stick. If the player is dissatisfied with the letters that he has, the ball may be re-rolled to him to obtain a new letter with a penalty of one point for each re-rolling. One point is awarded for each word formed. The first player to accumulate a certain number of points wins the game.

4 Claims, 1 Drawing Sheet

BALL AND STICK LETTER GAME AND METHOD OF PLAY

BACKGROUND OF THE INVENTION

This invention relates to the field of alphabet games for children. More particularly, it relates to a ball and stick game which teaches children the alphabet and how to spell words.

There are many devices known in the educational and entertainment field which allow children to play a game while still fostering the salutary purpose of teaching them to read or spell. The game of SCRABBLE is usually played by adults but is a well-known board game which can also be played by children. A number of other games have been devised which have the purpose of teaching children how to spell words as well as entertaining them with a game.

One such alphabet game was patented in 1982 by Jesse Jones. Although the Jones game is a card and board game which also uses chips, it has the same general purpose as the instant invention. Jones U.S. Pat. No. 4,344,627 thus has the same purpose but teaches a different method and utilizes different objects and game pieces to impart learning to the child during the playing of the game.

The 1992 patent issued to Crow, U.S. Pat. No. 5,161,976, is an alphabet teaching and learning game which utilizes a set of 50 cards divided into two groups of 25 each. While the purpose of the Crow patent is similar to the instant device, it uses cards rather than the unique method of playing the alphabet learning game below described.

Yet another game used to teach children the alphabet and spelling is found in the 1987 U.S. Pat. No. 4,690,409, issued to Antonino Scalia. That game utilizes two disks and pivotable arrows which in turn provide letters for the playing of the game. While the Scalia device utilizes scoring and letters, the method of playing the Scalia game is decidedly different from the ball and stick game herein described.

Many of the games above described, as well as other alphabet games for children, disclose unique and salutary devices for teaching children the alphabet and spelling while also entertaining them. However, none of these games requires the manual dexterity and coordination set out in the instant invention. Additionally, the use of the ball and stick provides a physically entertaining as well as intellectually stimulating game for children.

It is an object of this invention to provide an entertaining game for children and young adults which also teaches them the alphabet and the spelling of words. It is a further object of this invention to provide an alphabet and word teaching game which also has an element of physical dexterity and exhilaration involved in playing the game.

It is a still further object of this invention to provide a unique and entertaining game which has certain physical aspects and which teaches a child the alphabet and the spelling of words while also requiring physical dexterity and coordination. Other and further objects of this invention will become apparent upon reading the below described Specification.

BRIEF DESCRIPTION OF THE INVENTION

This invention comprises a ball having capital letters placed on the outer surface of the ball in a random fashion. The ball may be vinyl or it may be covered in a Velcro-style transparent covering. The pick-up stick has an elongated handle and an attaching surface at one end. The attaching surface of the pick-up stick allows a player to stop the ball and attach the end of the pick-up stick to the ball over one of the capital letters randomly spaced on the ball surface. As the ball is rolled between players, the players accumulate up to seven letters. The letter found under the end of the pick-up stick when the stick is attached to the rolling ball is the letter assigned to the player. Once each player has seven letters, the players are given a certain period of time, usually three minutes, in which to write down as many words from their given seven letters as possible. Should a player decide that he does not have the appropriate letters to make a word, he may ask for the ball to be re-rolled to him. The player gives up one of his original seven letters for the new letter obtained from the re-roll. One point is deducted from the players total for each time the ball is re-rolled to him. One point is awarded to each player for each word that he writes down from his seven letters within the three minute period. The game continues until one player accumulates 25 total points.

DETAILED DESCRIPTION OF THE PREFERRED EMBODIMENT

A game for learning the alphabet and words comprises a spherical ball and a plurality of pick-up sticks. The pick-up stick is constructed so that it will attach itself to the ball such that in attaching the stick to the ball one also covers up one of the letters on the ball surface.

Figure 1:
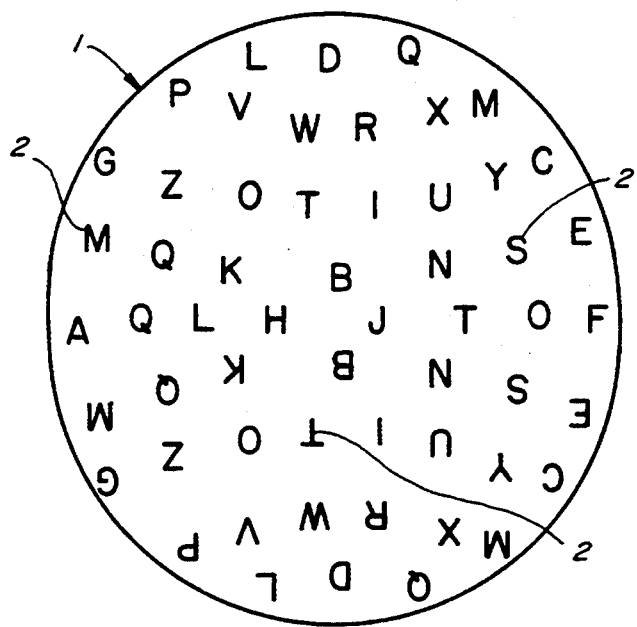
FIG. 1 is a front view of the alphabet ball showing the capital letters randomly spaced.

Turning to FIG. 1, the alphabet ball 1 is shown. The ball is essentially spherical as shown on FIG. 1. The entire surface of the ball has randomly spaced capital letters 2 as shown. These letters have spaces in between each letters such that when the pick-up stick is attached to the ball it would cover only one of the capital letters.

The ball may be made from many different materials, a rubber or vinyl ball being preferred. The ball is large enough such that many different letters of the alphabet will be accommodated on its surface and such that sufficient spacing will be provided between each letter so that the pick-up stick will cover only one letter each time the pick-up stick is attached to the rolling ball.

The ball may be made entirely of vinyl, in which case it may be picked-up by a suction cup end of the pick-up stick. In the preferred embodiment, however, the entire surface of the ball 1 is covered with a clear adhesive pile surface which may be securely attached to the VELCRO hook surface on the ball when such contact is made. The adhesive pile surface on the ball 1 is clear so that the letters show through to the surface of the ball.

Figure 2:
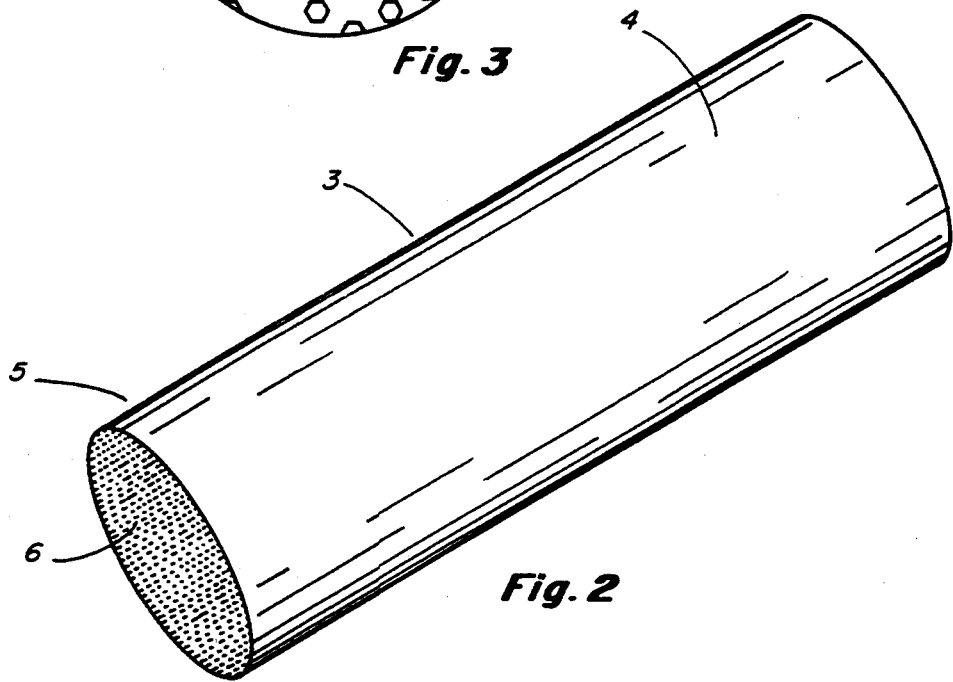
FIG. 2 is a perspective view of the VELCRO pick-up stick showing the VELCRO hook surface.

The preferred method of picking up the ball as it is rolled between the players is to use the pick-up stick 3 shown on FIG. 2. This pick-up stick 3 has essentially two ends, a handle end 4 and a hook end 5. The hook end 5 of the pick-up stick 3 has an essentially flat surface 6 comprising a VELCRO hook surface. This VELCRO hook surface 6 is readily attached to the ball 1 which is covered with the clear adhesive pile surface of the preferred embodiment of the ball.

Figure 3:
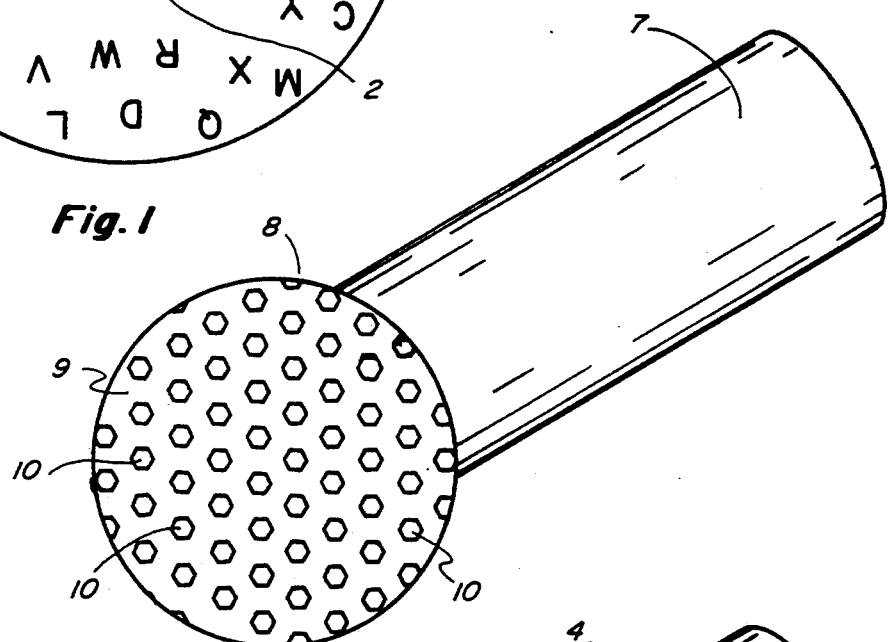
FIG. 3 is a perspective view of an alternative embodiment of the pick-up stick showing the pick-up sphere having suction cups.

Another embodiment of this device comprises an alphabet letter ball which is covered in vinyl or an equivalent material. This vinyl covered ball would be picked up by an alternative pick-up stick shown in FIG. 3. This vinyl style pick-up stick comprises having a handle end 7 and a ball securing end 8. The ball securing end 8 of this alternative embodiment has a securing sphere 9 on the securing end 8. On the outer surface of this securing sphere 9 are located a plurality of securing sphere suction cups 10. These small suction cups are capable of attaching the pick-up stick to the vinyl ball.

In either the VELCRO embodiment or the vinyl/suction cup embodiment of this invention, the securing end (securing end 8 for the vinyl embodiment or hook end 5 of the VELCRO embodiment) is proportioned such that one letter 2 located on the surface of ball 1 will be positioned underneath the securing end of the stick once the ball is rolled towards a player.

The instant game may be played with only one person, however the preferred method of playing the game involves two or more players. The game begins with the players arranging themselves such that one player may roll the ball 1 to the second player who has a pick-up stick. As the ball is rolled between players, each player attaches the alphabet ball to the pick-up stick such that one letter on the surface of the ball 1 is positioned underneath the end of the pick-up stick 3.

Play is rotated from player to player and the ball is rolled to each player in turn until each player has picked up the ball 1 seven times. Each player will then have accumulated seven letters which are written down, one at a time, after each player secures the ball to the pick-up stick.

Once each player has seven letters, he may decide to exchange one or more of his letters. In order to exchange one or more of his letters, the player announces his intention to exchange a letter. The player then crosses off one or more letters from his list. The ball is then rolled to that player who picks up the ball with the pick-up stick, thus obtaining another randomly spaced letter. The player forfeits one point for each time the ball is re-rolled to that player. When everyone is satisfied with the letters that he has, a set time period is begun during which players try to form as many words as possible from their seven letters. One point is awarded to each player for each word that he forms during the set time period.

The game is won when one player accumulates a total of 25 points. Each player obtains one point for each word formed during the set time period but loses one point for each time the ball is re-rolled to that player at his request.

In the above manner the game is played. Because the game involves rolling a ball and catching it on the end of a stick, a certain amount of manual dexterity and physical coordination is required. The game not only requires the ability to catch the ball, but also the mental acuity to accumulate a certain number of letters from which the player can form the maximum amount of words. The player's mental processes are thus brought into the game as the player must decide whether or not the letters that he has can form a sufficient number of words to outweigh the option of obtaining one or more new letters by re-rolling the ball for a penalty of one point each.

In the preferred embodiment, seven letters should be accumulated by each player before the set period for forming words begins. However, as can be readily appreciated, any number of letters can be used during this set period, depending on the wishes of the players playing the game. Obviously, the more letters the player has at his disposal the faster he will accumulate the number of points required to win the game. Hence, the winning number of points may vary from 25 on upwards to any figure. Alternatively, the winning number of points may be less than 25 if a shorter game is desired. It can also be appreciated that the set time limit for forming the words can be varied depending upon the age and education of the players. In the preferred embodiment a three minute time limit is recommended for each round of word forming. However, this time limit can be varied.

In regard to the construction of the ball, it is readily appreciated that different embodiments of the ball and pick-up stick are possible while still keeping within the spirit of this invention. Many different means of attaching the pick-up stick to the ball may be available, although the preferred method involves either the VELCRO hook and pile method or the vinyl/suction cup securing method.

In the vinyl/suction cup method, the handle end of the pickup stick would be approximately five to eight inches long with the handle being made of approximately ¾" diameter plastic rod. The securing sphere 9 used at the other end of the plastic rod would be approximately 1½" inches in diameter with the suction cups being quite small and covering the entire surface of-the securing end 8 of the pick-up stick.

The size of the ball can vary, the important proportion being that the capital letters located on the surface of the ball should be spaced far enough apart such that only one letter will be covered when the pick-up stick is attached to the alphabet ball surface as it rolls towards a player. However, different colors, dimensions, and materials may be used in practicing this invention while still keeping within the spirit hereof.

Having fully described my invention, I claim:

1. A method of playing an alphabet ball-and-stick game for two or more players, comprising the steps of:
   (a) rolling a ball having letters on the surface of said ball between at least two players;
   (b) attaching said ball to said pick-up stick such that one letter on the surface of said ball is underneath an end of said stick;
   (c) writing down the letter obtained from step (b);
   (d) repeating steps (a) through (c) for each player until each player has a plurality of letters;
   (e) changing one or more of any player's plurality of letters by re-rolling said ball to that player, with that player forfeiting one point for each time the ball is re-rolled to him;
   (f) forming words from each player's plurality of letters within a time period;
   (g) winning the game by obtaining one point for each word formed, subtracting one point for each time the ball is re-rolled, and accumulating 25 points.

2. An alphabet game using hook and pile fasteners, comprising:
   (a) a ball having letters of the alphabet randomly placed on the surface of said ball, wherein said ball is covered with a clear adhesive pile surface;

(b) one or more pick-up sticks having an adhesive hook surface covering one end of said stick for attaching said ball to said adhesive hook end of said stick;

whereby a random letter underneath said adhesive hook end of said stick is determined and awarded to a player.

3. An alphabet game, using hook and pile fasteners, comprising:

(a) a ball having letters of the alphabet randomly placed on the surface of said ball, wherein said ball is covered with a smooth, non-porous surface;

(b) one or more pick-up sticks, one end of said stick comprising a pick-up sphere having suction cups covering the entire surface of said sphere for attaching said ball to said spherical end of said stick;

whereby a random letter underneath said spherical end of said stick is determined and awarded to a player.

4. An alphabet game as described in claim 3, wherein said smooth, non-porous surface of said ball comprises vinyl.

* * * * *